(12) United States Patent
Liu

(10) Patent No.: US 7,798,657 B2
(45) Date of Patent: Sep. 21, 2010

(54) PROJECTION APPARATUS

(75) Inventor: I-Hsien Liu, Hsinchu (TW)

(73) Assignee: Coretronic Corporation, Hsinchu (TW)

( * ) Notice: Subject to any disclaimer, the term of this patent is extended or adjusted under 35 U.S.C. 154(b) by 699 days.

(21) Appl. No.: 11/740,934

(22) Filed: Apr. 27, 2007

(65) Prior Publication Data

US 2008/0018865 A1    Jan. 24, 2008

(30) Foreign Application Priority Data

Jun. 6, 2006    (TW) ............................... 95119984 A

(51) Int. Cl.
G03B 21/14    (2006.01)
F16M 7/00    (2006.01)
(52) U.S. Cl. ................... 353/101; 353/119; 248/157; 248/188.2; 248/188.8
(58) Field of Classification Search .................. 353/70, 353/101, 119; 248/157, 188.2, 188.8
See application file for complete search history.

(56) References Cited

U.S. PATENT DOCUMENTS

| | | | | |
|---|---|---|---|---|
| 2,135,797 A | * | 11/1938 | Chambers | 248/185.1 |
| 2,572,468 A | * | 10/1951 | Gibson | 248/181.2 |
| 3,404,938 A | * | 10/1968 | Kubnick et al. | 352/242 |
| 3,765,755 A | * | 10/1973 | Samuels et al. | 353/27 R |
| 3,985,430 A | * | 10/1976 | Steiner | 353/61 |
| 4,473,177 A | * | 9/1984 | Parandes | 224/191 |
| 4,546,942 A | * | 10/1985 | Winchel | 248/187.1 |
| 5,337,100 A | * | 8/1994 | Oxford | 396/428 |
| 6,302,543 B1 | | 10/2001 | Arai et al. | |
| 6,467,908 B1 | * | 10/2002 | Mines et al. | 353/28 |
| 6,547,396 B1 | | 4/2003 | Svardal et al. | |
| 2005/0031335 A1 | * | 2/2005 | Itzkowitz | 396/419 |
| 2006/0056836 A1 | * | 3/2006 | Ramadan | 396/329 |
| 2008/0018865 A1 | * | 1/2008 | Liu | 353/119 |

FOREIGN PATENT DOCUMENTS

TW    200612806    4/2006

\* cited by examiner

Primary Examiner—John R Lee
(74) Attorney, Agent, or Firm—Jianq Chyun IP Office

(57) ABSTRACT

A projection apparatus including a projection body, a support and a pivoting member is provided. The support is disposed underneath the projection body. The pivoting member serves as a pivot between the projection body and the support, and both sides of the support are supported on a supporting surface. The projection body is suitable for swinging with the pivoting member as a pivot and therefore users are able to quickly adjust the degree of elevation and inclination of the projection body.

11 Claims, 6 Drawing Sheets

PROJECTION APPARATUS

CROSS-REFERENCE TO RELATED APPLICATION

This application claims the priority benefit of Taiwan application serial no. 95119984, filed Jun. 6, 2006. All disclosure of the Taiwan application is incorporated herein by reference.

BACKGROUND OF THE INVENTION

1. Field of the Invention

The present invention relates to a projection apparatus, and more particularly, to a projection apparatus capable of quickly adjusting a position of an image projected thereby.

2. Description of Related Art

With the rapid advance in technologies, various types of projection apparatus are deployed in many different occasions such as briefings, lectures, theatres, audio-visual lecturing, activity teaching and home theatre. To meet the requirements of users, the projection apparatus has a light and compact design and a projection angle of the projection apparatus is adjusted through a supporting leg.

FIG. 1A is a top view of a conventional projection apparatus, and FIG. 1B is a front view of the projection apparatus in FIG. 1A. As shown in FIGS. 1A and 1B, the projection apparatus 100 includes a casing 110, a projection lens 120, two elevating legs 130 and a supporting leg 140. The casing 110 has a front end 112, a rear end 114 and a bottom portion 116. The projection lens 120 is assembled to the front end 112 of the casing 110. The two elevating legs 130 are disposed separately on the bottom portion 116 of the casing 110 close to the front end 112 and the supporting leg 140 is disposed on the bottom portion 116 of the casing 110 close to the center of the rear end. As shown in FIG. 1C, users are free to independently adjust the two elevating legs 130 when using the projection apparatus 100 so that the degree of elevation (α) and the degree of inclination (β) of the projection apparatus 100 are changed to adjust the position of the projected image. In general, the elevating legs 130 of a conventional projection apparatus 100 are made up of elevating screws. To perform an adjustment, the projection apparatus 100 has to be lifted up before adjustment being made, which is difficult and inconvenient for users. Therefore, some of the manufacturers have made some improvements to the mechanism of the elevating legs to resolve this problem, for example, in U.S. Pat. No. 6,302,543 B1. However, the solution recited in U.S. Pat. No. 6,302,543 B1 has a rather complicated mechanism and the cost of production is relatively high.

SUMMARY OF THE INVENTION

Accordingly, the present invention is to provide a projection apparatus capable of quickly adjusting the location of a projected image and yet having a simple structure and a low production cost.

Other objectives, features and advantages of the present invention will be further understood from the further technology features disclosed by the present invention wherein there is shown and described a preferred embodiment of this invention, simply by way of illustration of one of the modes best suited to carry out the invention.

To achieve one, some or all of the above-mentioned objectives or other objectives, the invention provides a projection apparatus. The projection apparatus includes a projection body, a support and a pivoting member. The support is disposed underneath the projection body. The pivoting member serves a pivot between the projection body and the support and both sides of the support are supported on a supporting surface. The projection body is suitable for swinging with the pivoting member as a pivot.

In the present invention, a simple adjusting mechanism comprising a support and a pivoting member is used so that the problem of difficulty adjusting the location of a projected image within a conventional projection apparatus is resolved. Additionally, the present invention adjusts the projected image from projection apparatus without utilizing complicated adjusting mechanism, and therefore, high production cost of the projection apparatus is prevented.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1A:
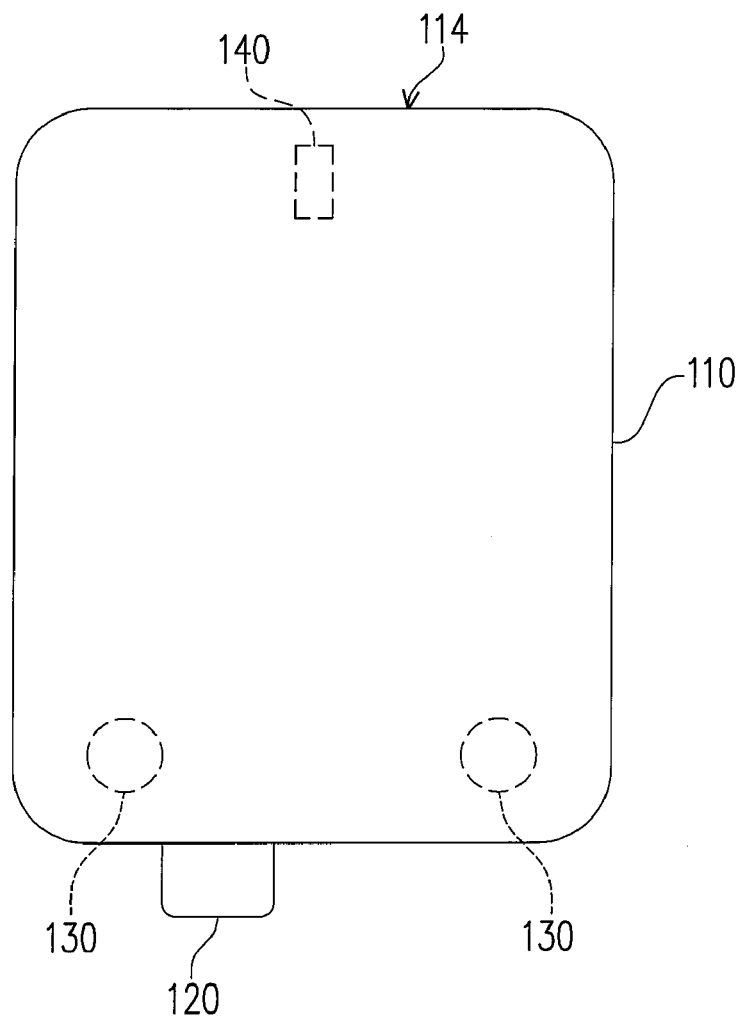
FIG. 1A is a top view of a conventional projection apparatus.
Figure 1B:
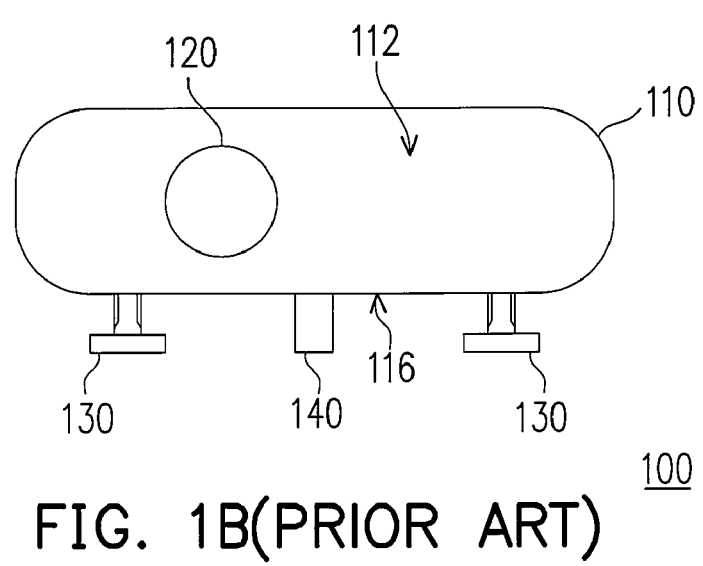
FIG. 1B is a front view of the projection apparatus in FIG. 1A.
Figure 1C:
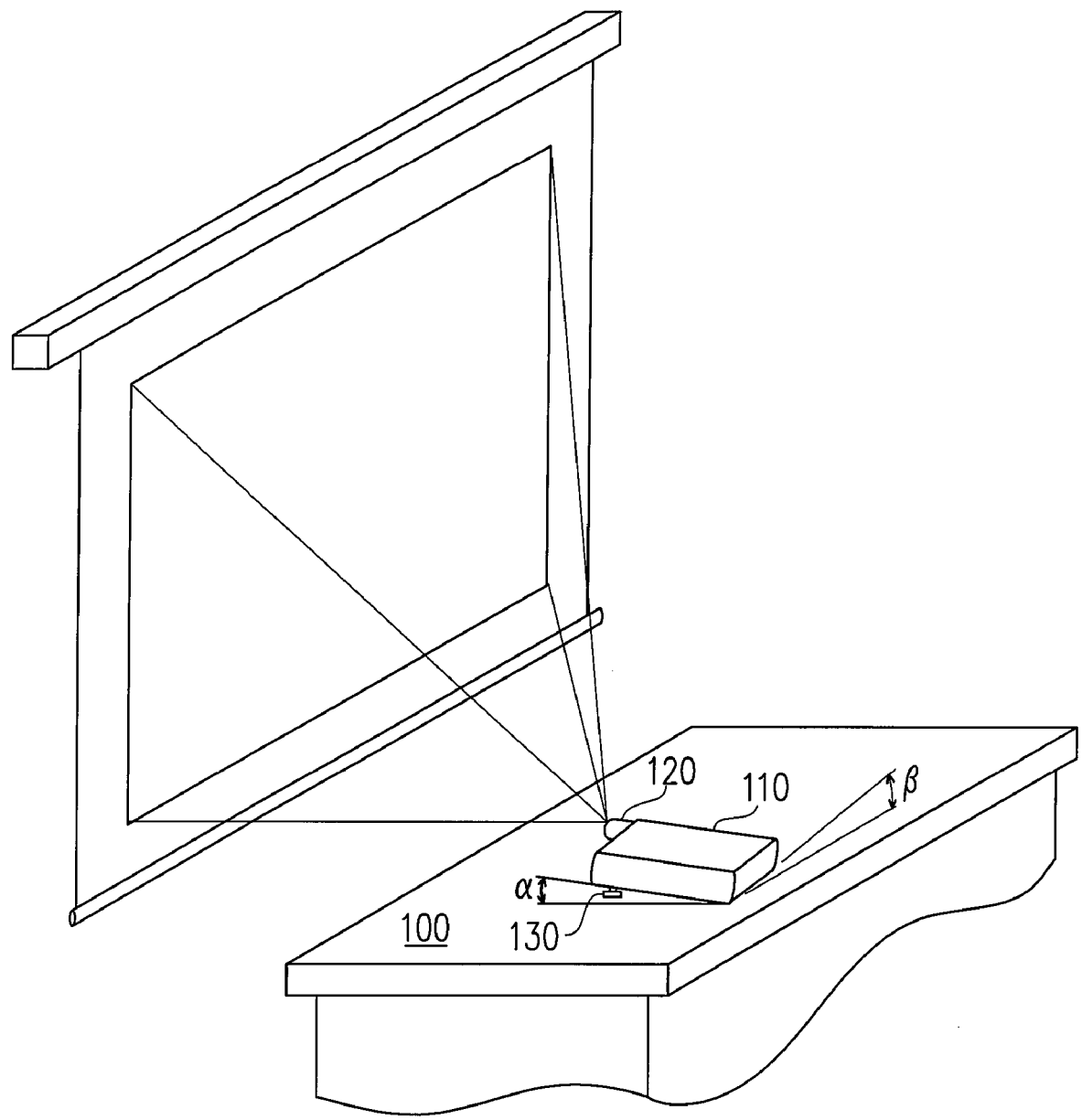
FIG. 1C is a perspective view showing the conventional projection apparatus projecting an image on a screen.

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Reference will now be made in detail to the present preferred embodiments of the invention, examples of which are illustrated in the accompanying drawings. Wherever possible, the same reference numbers are used in the drawings and the description to refer to the same or like parts.

Figure 2A:
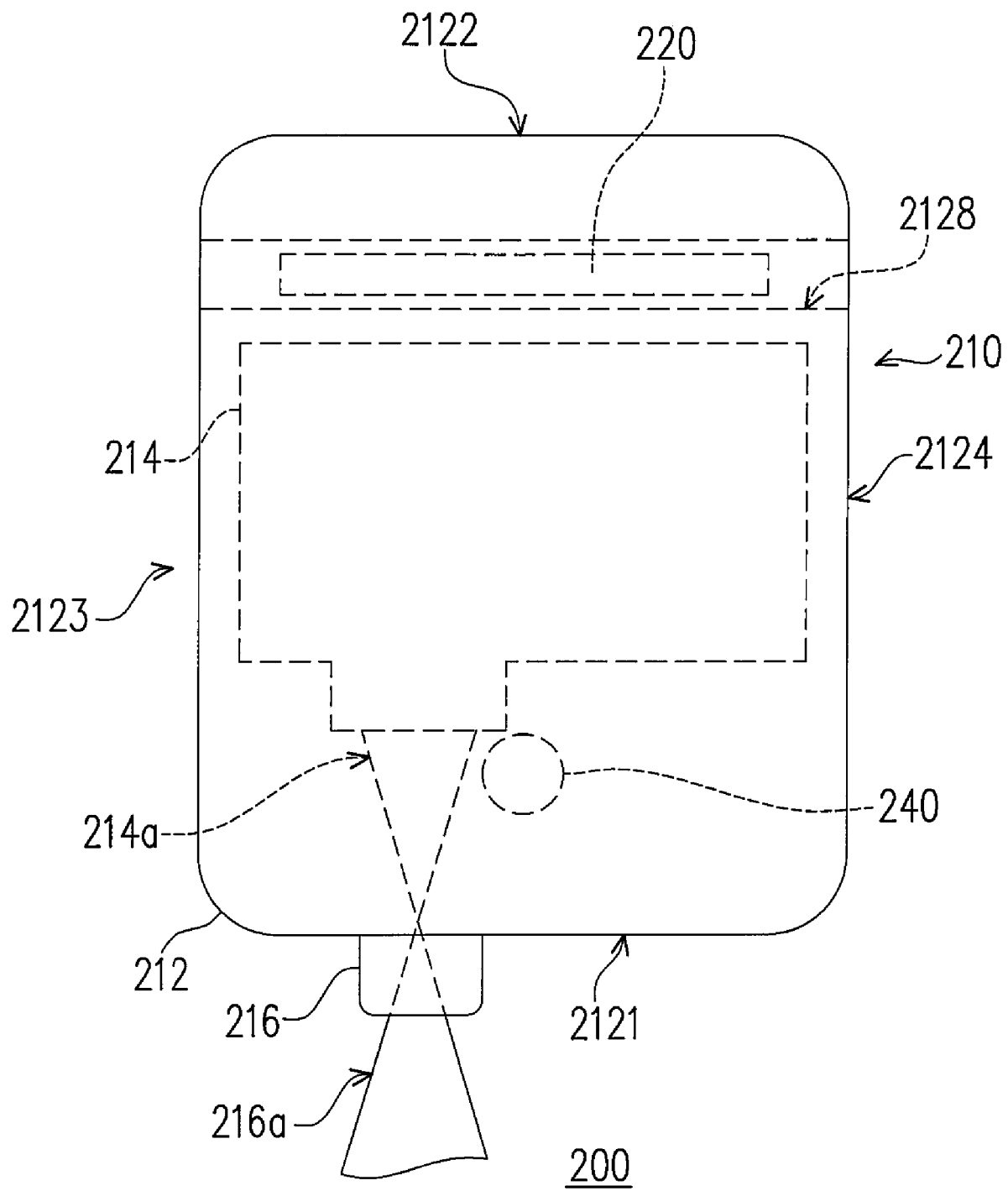
FIG. 2A is a top view of a projection apparatus according to one embodiment of the present invention.
Figure 2B:
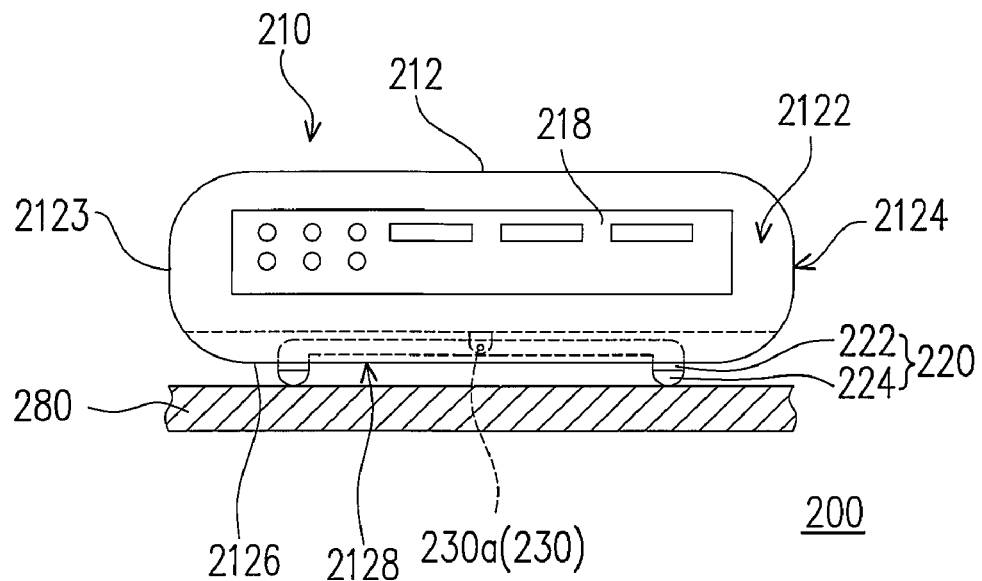
FIG. 2B is a rear view of the projection apparatus in FIG. 2A.
Figure 2C:
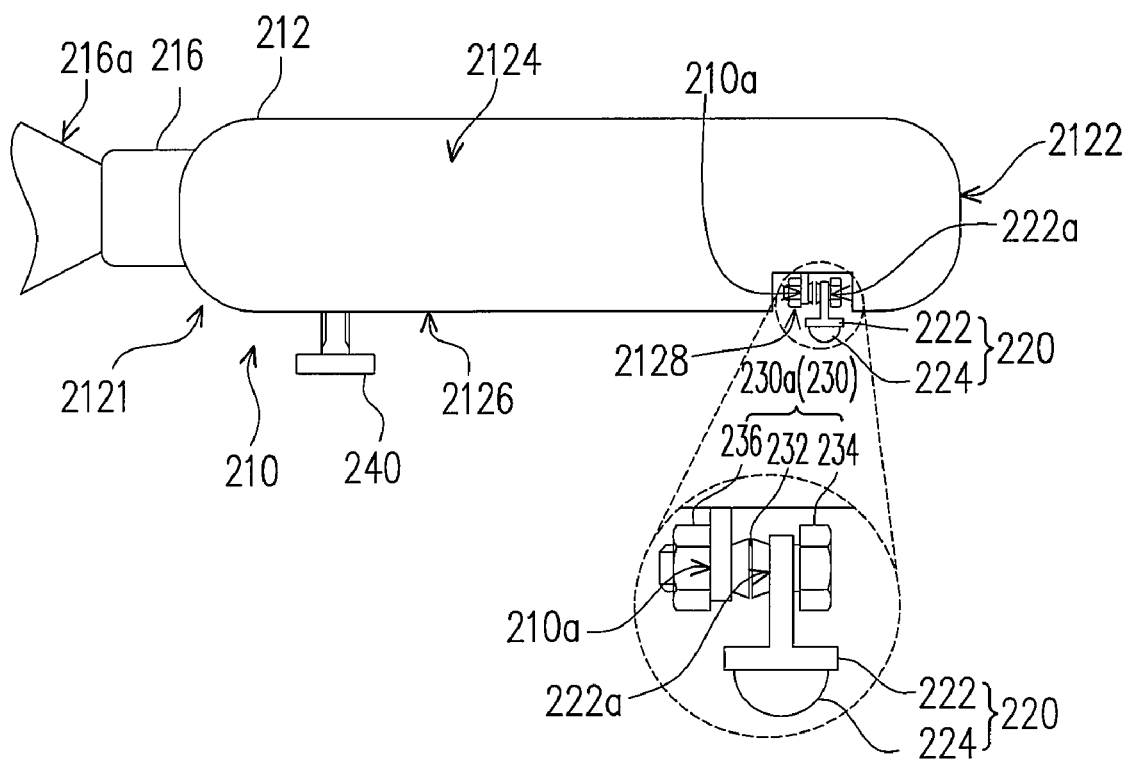
FIG. 2C is a side view of the projection apparatus in FIG. 2A.

As shown in FIGS. 2A, 2B and 2C, the projection apparatus 200 in the present embodiment includes a projection body 210, a support 220 and a pivoting member 230. In the following embodiment, a hinge 230a is only illustrated as an example of the pivoting member 230. However, the pivoting member 230 is not limited to using a hinge 230a. For example, the present invention can also use a universal joint or any other element capable of replacing the hinge 230a to pivot the support 220 and the projection body 210. The support 220 is disposed underneath the projection body 210. The hinge 230a serves as a pivot between the projection body 210 and the support 220, and both ends of the support 220 are supported on a supporting surface 280. The projection body 210 is suitable for swinging with the hinge 230a serving as a pivot. In the present embodiment, the projection body 210 includes a casing 212, an optical engine 214, a projection lens 216 and a signal input/output (I/O) interface 218. Furthermore, the optical engine 214 is disposed inside the casing 212 and suitable for providing a first image 214a. The projection lens 216 is assembled to the casing 212 and located on an optical path of the first image 214a to project a second image 216a to a display screen or a wall. The signal input/output interface 218 is assembled to the casing 212 and electrically connected to the optical engine 214.

In the present embodiment, the support 220 includes a rod element 222 and two elastic legs 224. The rod element 222 has an assembling hole 222a. Both elastic legs 224 are fabricated from rubber or other material and are connected to both ends of the rod element 222 and located between the rod element 222 and the supporting surface 280. The assembling hole 222a in the rod element 222 is located between those two elastic legs 224 for assembling with the hinge 230a. As shown in FIG. 2C, the projection body 210 has an assembling hole 210a. Furthermore, the hinge 230a includes an elastic cushion 232, a threaded bolt 234 and a screw nut 236. The threaded bolt 234 passes through the assembling hole 222a of the support 220, the elastic cushion 232 and the assembling hole 210a of the projection body 210 so that the screw nut 236 is screwed into the end of the threaded bolt 234. However, the present invention is not limited to the use of a threaded bolt 234 to serve as a pivot for connecting the support 220 and hinge 230a. For example, the support 220 and the hinge 230a may also be tight fit.

In addition, the casing 212 in the present embodiment has a front end 2121, a rear end 2122, a left end 2123, a right end 2124 and a bottom portion 2126. The projection lens 216 is assembled to the front end 2121 of the casing 212 and the signal input/output interface 218 is assembled to the rear end 212 of the casing 212. However, the assembling of the signal input/output interface 218 is not limited to the rear end 2122 of the casing 212. For example, the signal input/output interface 218 may be assembled to the bottom portion 2126, the left end 2123 or the right end 2124.

Furthermore, the bottom portion 2126 of the casing 212 has an accommodating slot 2128 that extends from the left end 2123 to the right end 2124 for accommodating the support 220, and the hinge 230a is disposed inside the accommodating slot 2128. The projection body 210 is suitable for swinging with the hinge 230a serving as a pivot. Moreover, the swinging of the projection body 210 is suitable for adjusting the degree of inclination of the projection apparatus 200 and rotating the second image 216a projected form the projection body 210. Because the adjusting mechanism for adjusting the degree of inclination of the projection apparatus in the present invention is quite simple, the cost of producing the projection apparatus is lowered. When the projection apparatus of the present invention is placed on an uneven supporting surface (for example, an uneven desk or other tilted object surface), the user can lightly press the left and right end of the projection body to rotate the projection apparatus with the hinge serving as a pivot. Thus, the angle of inclination of the projection body is changed so that the second image is adjusted to a horizontal level. Therefore, the projection apparatus in the present invention resolves the problem of having difficulty adjusting the projected image location occurred within a conventional projection apparatus. Moreover, the design of support within the accommodating slot makes the projection apparatus artistic.

The projection apparatus 200 in the present embodiment may further includes an elevating legs 240 disposed on the bottom portion 2126 of the casing 210 between the support 220 and the front end 2121 of the casing 210. When the user adjusts the height of the elevating leg 240, the front end 2121 of the projection body 210 is raised and lowered with the support 220 serving as a pivot. Therefore, the user can adjust the degree of elevation of the projection lens 216 by adjusting the height of the elevating leg 240. In the present invention, the elevating leg 240 can be a screw or other conventional mechanism.

Figure 3A:
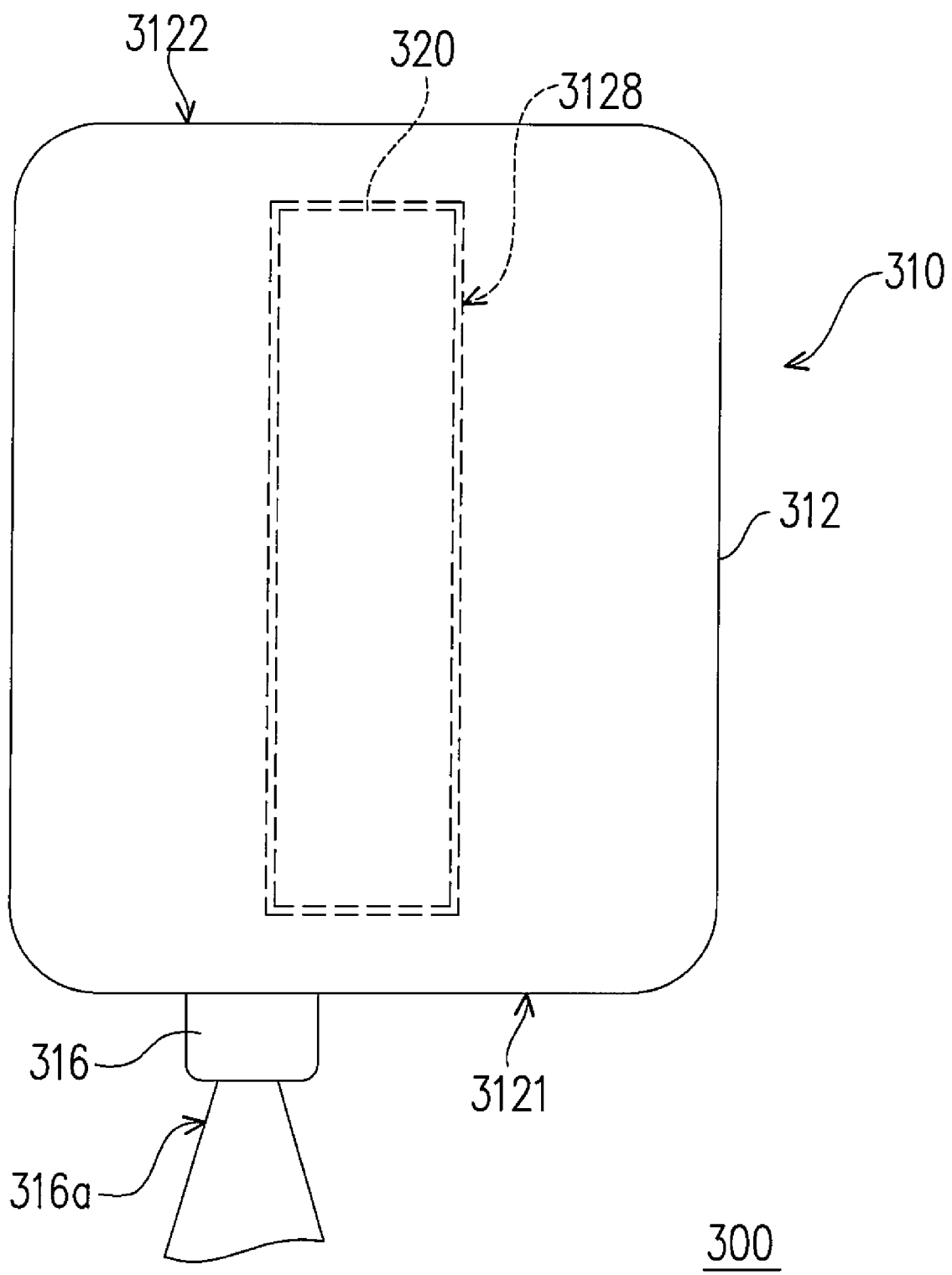
FIG. 3A is a top view of a projection apparatus according to another embodiment of the present invention.
Figure 3B:
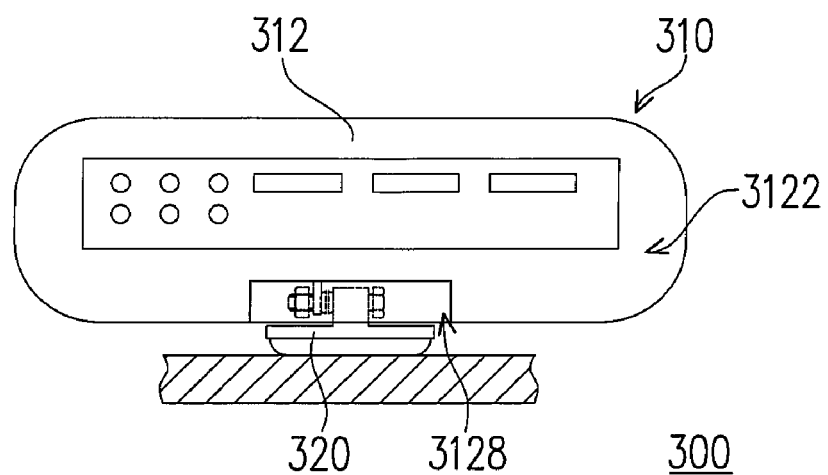
FIG. 3B is a rear view of the projection apparatus in FIG. 3A.
Figure 3C:
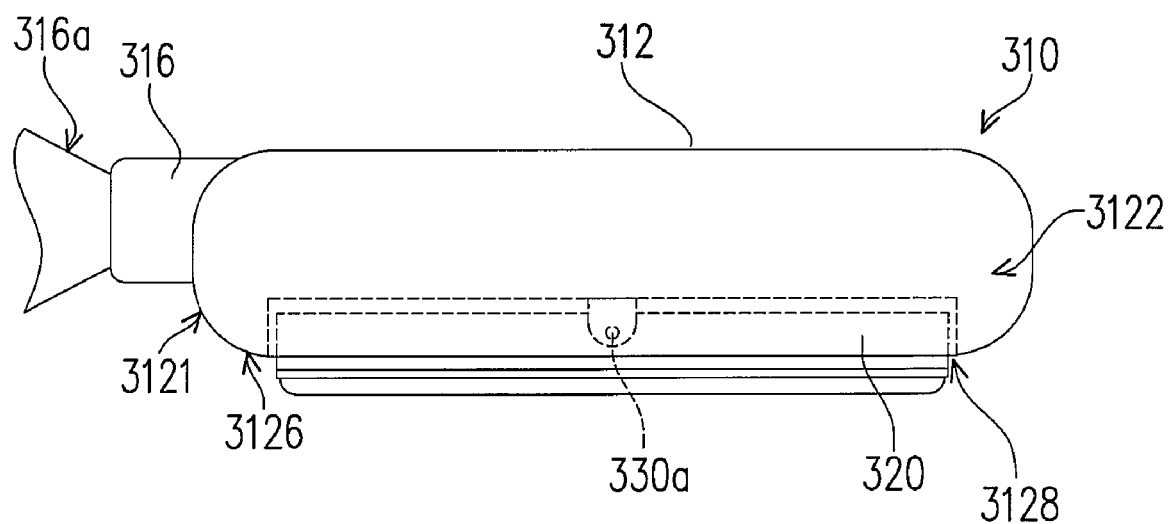
FIG. 3C is a side view of the projection apparatus in FIG. 3A.

As shown in FIGS. 3A, 3B and 3C, the projection apparatus 300 is structurally similar to the projection apparatus 200 except that the accommodating slot 3128 is disposed on the bottom portion 3126 of the casing 312 and extending from the front end 3121 to the rear end 3122 of the casing 312, and the accommodating slot 3128 is used for accommodating the support 320. Therefore, the projection body 310 is more suitable for swinging in a front-rear direction with the hinge 330a serving as a pivot. In other words, the swinging direction is suitable for adjusting the degree of elevation of the projection lens 316.

In the present invention, a simple adjusting mechanism comprising a support and a hinge are used. Thus, the present invention is able to resolve the problem of a high production cost for fabricating the complicated adjusting mechanism within the conventional projection apparatus. Furthermore, since adjusting mechanism is easier to operate, the difficult of adjusting the conventional projection apparatus is also resolved. Moreover, the design of support hiding within the accommodating slot makes the projection apparatus artistic.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection apparatus, comprising:
    a projection body;
    a support, disposed underneath the projection body and comprising:
        a rod element having an assembling hole thereon; and
        two elastic legs connected to both ends of the rod element and supported on a supporting surface, the assembling hole being located between the elastic legs; and
    a pivoting member, pivoted between the projection body and the support for the support being supported on the supporting surface, the pivoting member being assembled to the rod element through the assembling hole, wherein the pivoting member is capable of seesawing with respect to the projection body with the pivoting member serving as a pivot, such that the both ends of the rod element swing toward and away from the projection body, one end of the rod element swinging toward the projection body accompanies the other end of the rod element swinging away from the projection body, and the one end of the rod element swinging away from the projection body accompanies the other end of the rod element swinging toward the projection body, such that one end of the projection body is suitable for swinging toward and away from the supporting surface with the pivoting member serving as the pivot, and the projection body is capable of seesawing with respect to the supporting surface.

2. The projection apparatus of claim 1, wherein the projection body comprises:
    a casing;
    an optical engine, disposed inside the casing and suitable for providing a first image; and
    a projection lens, assembled to the casing, wherein the projection lens is located on an optical path of the first image to project a second image.

3. The projection apparatus of claim 2, further comprising an elevating leg disposed on a bottom portion of the casing for the second image being raised and lowered relative to the supporting surface by adjusting the elevating leg.

4. The projection apparatus of claim 2, wherein the casing has a front end and a rear end, and the projection lens is assembled to the front end of the casing.

5. The projection apparatus of claim 4, wherein the casing has a bottom portion, the bottom portion of the casing has an accommodating slot for accommodating the support and the pivoting member is located inside the accommodating slot.

6. The projection apparatus of claim 5, wherein the accommodating slot extends from a left end to a right end of the casing.

7. The projection apparatus of claim 5, wherein the accommodating slot extends from the front end to the rear end of the casing, and the support is suitable for raising and lowering the second image projected from the projection body relative to the supporting surface.

8. The projection apparatus of claim 1, wherein the elastic legs comprises rubber legs.

9. The projection apparatus of claim 1, wherein pivoting member comprises a universal joint.

10. The projection apparatus of claim 1, wherein the pivoting member comprises a hinge.

11. The projection apparatus of claim 10, wherein the hinge comprises:
    an elastic cushion;
    a threaded bolt, passing through the elastic cushion, the support and the projection body, wherein the elastic cushion is supported between the projection body and the support for the projection body being able to swing with the threaded bolt serving as a pivot; and
    a screw nut, screwed into the threaded bolt.

* * * * *